United States Patent

Hirahara et al.

[11] Patent Number: 5,599,057
[45] Date of Patent: Feb. 4, 1997

[54] VEHICLE BODY SIDE STRUCTURE

[75] Inventors: Shinichi Hirahara; Hiroki Morimoto, both of Wako, Japan

[73] Assignee: Honda Giken Kogyo Kabushiki Kaisha, Tokyo, Japan

[21] Appl. No.: 264,168

[22] Filed: Jun. 22, 1994

[30] Foreign Application Priority Data

Jun. 23, 1993 [JP] Japan .................................. 5-151721

[51] Int. Cl.⁶ ...................................................... B60J 5/04
[52] U.S. Cl. ........................................ 296/146.6; 296/188
[58] Field of Search ............................... 296/146.6, 188, 296/189

[56] References Cited

U.S. PATENT DOCUMENTS

| 3,718,364 | 2/1973 | Fischer et al. | 296/146.6 X |
| 4,013,317 | 3/1977 | Reidelbach et al. | 296/146.6 |
| 5,137,325 | 8/1992 | Ohya . | |
| 5,417,470 | 5/1995 | Holt | 296/188 |
| 5,470,125 | 11/1995 | Yamazaki | 296/188 X |

FOREIGN PATENT DOCUMENTS

| 2698322 | 5/1994 | France | 296/188 |
| 4027619 | 1/1992 | Japan | 296/146.6 |
| 4095525 | 3/1992 | Japan | 296/146.6 |
| 1340833 | 12/1973 | United Kingdom . | |
| 1444790 | 8/1976 | United Kingdom . | |

*Primary Examiner*—Joseph D. Pape
*Attorney, Agent, or Firm*—Armstrong, Westerman, Hattori, McLeland & Naughton

[57] ABSTRACT

A door beam housed in a vehicle door has a rear end which is positioned in overlapping relationship to a central pillar in the lateral direction of a vehicle body. A bracket which is of a channel-shaped horizontal cross section is fixed to the rear of the door beam so as to be positioned closely to the central pillar when the door is closed. The bracket is effective in increasing the lateral rigidity of the vehicle body to efficiently absorb and distribute shocks applied during a lateral collision from an initial phase thereof.

16 Claims, 6 Drawing Sheets 5,599,057

VEHICLE BODY SIDE STRUCTURE

BACKGROUND OF THE INVENTION

1. Field of the Invention

The present invention relates to a vehicle body side structure having door beams disposed in a vehicle door.

2. Description of the Prior Art

There has been known a vehicle body side structure having a door beam disposed in a vehicle door for effectively protecting a vehicle passenger from a lateral collision.

One conventional vehicle body side structure of a motor vehicle is disclosed in FIG. 10 of the accompanying drawings. As shown in FIG. 10, a front door 100 comprises an outer panel 101 and an inner panel 102 spaced laterally therefrom. The front door 100 has a front end pivotally supported on a front pillar 104 by a lever 103. A rear door 105 is pivotally supported on a central pillar 106 by a lever 107.

A door beam 108 which extends in the longitudinal direction of the motor vehicle is disposed in the front door 100 closely to the outer panel 101. The door beam 108 has opposite ends supported between the outer panel 101 and the inner panel 102 by respective brackets 109 having flat ends.

Since the door beam 108 is supported at its opposite ends by the brackets 109 closely to the outer panel 101, there is created a space 110 between the rear end of the front door 100 and the central pillar 106.

When the motor vehicle collides laterally with another motor vehicle, for example, the shock may not effectively be absorbed wile the door 100 is being displaced through the space 110 into the passenger's compartment. Furthermore, because the brackets 109 with the flat ends are deformed, desired initial shock absorbing characteristics may not sufficiently be achieved.

SUMMARY OF THE INVENTION

It is therefore an object of the present invention to provide a vehicle body side structure whose body side rigidity is high enough to absorb and disperse lateral shocks during a lateral collision from an initial phase thereof.

According to the present invention, there is provided a vehicle body side structure in a vehicle body including a pillar, comprising a door, a door beam housed in the door and extending in a longitudinal direction of the vehicle body, the door beam having an end overlapping the pillar in a lateral direction of the vehicle body when the door is closed, and spacer means mounted on the end of the door beam for being positioned relatively closely to the pillar when the door is closed.

The spacer means may comprise a bracket projecting from the end of the door beam toward the pillar, or a bracket projecting vertically, the pillar including a bulging portion extending toward the end of the door beam. The bracket may be of a channel-shaped horizontal cross section.

According to the present invention, there is also provided a vehicle body side structure in a vehicle body including a pillar, comprising a door, a door beam housed in the door and extending in a longitudinal direction of the vehicle body, and a bracket mounted on the door and extending toward the pillar in overlapping relationship to the pillar in a lateral direction of the vehicle body when the door is closed.

According to the present invention, there is further provided a vehicle body side structure in a vehicle body including a pillar, comprising a door, a door beam housed in the door and extending in a longitudinal direction of the vehicle body, the door beam having an end overlapping the pillar in a lateral direction of the vehicle body when the door is closed, and means mounted on the end of the door beam for substantially eliminating a space between the door and the pillar when the door is closed.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
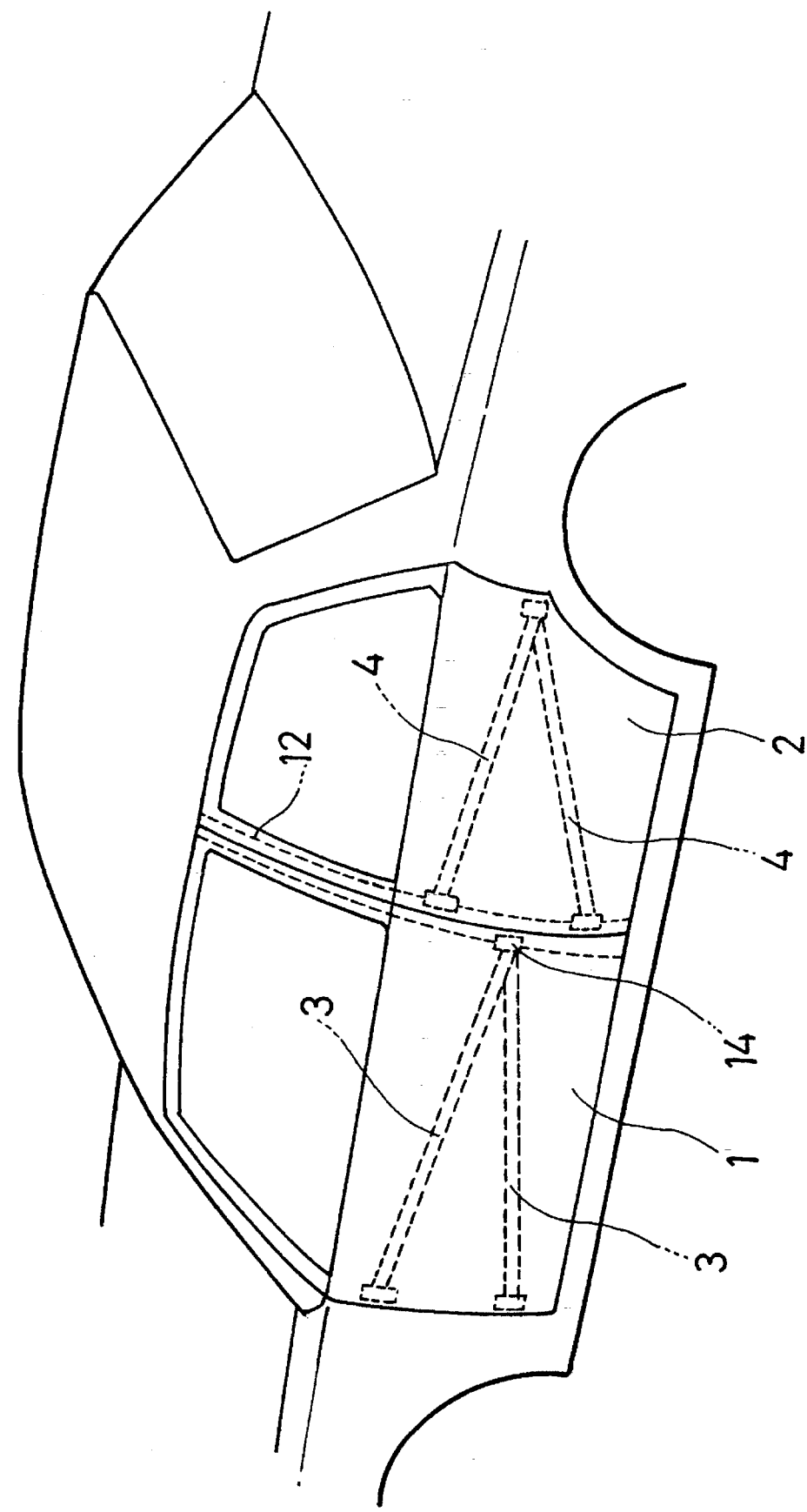
FIG. 1 is a fragmentary perspective view of a motor vehicle which incorporates a vehicle body side structure according to an embodiment of the present invention, the vehicle body side structure having door beams mounted in doors.

As shown in FIG. 1, a motor vehicle which incorporates a vehicle body side structure according to an embodiment of the present invention has a front door 1 housing a pair of door beams 3 and a rear door 2 housing a pair of door beams 4. The door beams 3 in the front door 1 extend substantially horizontally and converge toward each other in the shape of a tilted V located in a generally vertical plane as shown, and the door beams 4 in the rear door 2 also extend similarly oriented as shown in the shape of a V.

Figure 2:
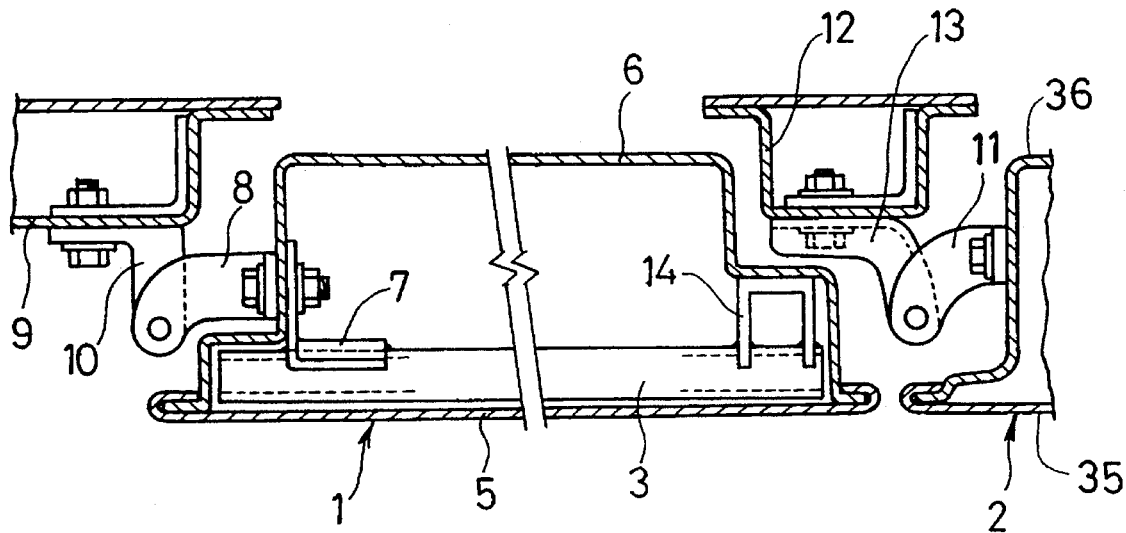
FIG. 2 is a fragmentary horizontal cross-sectional view of a front door of the motor vehicle shown in FIG. 1.

As shown in FIG. 2, the front door 1 comprises an outer panel 5 and an inner panel 6 spaced laterally therefrom. The outer panel 5 and the inner panel 6 have respective peripheral edges joined to each other. Each of the door beams 3 has a front end fixed to the inner surface of a front end of the inner panel 6 by a bracket 7 which has an L-shaped horizontal cross section. The bracket 7 projects inwardly from the door beam 3. A lever 8 is fastened to the outer surface of the front end of the inner panel 6. The lever 8 has a front end pivotally supported on a bracket 10 which is fastened to a front pillar 9 of a motor vehicle body. In this manner, the front door 1 is angularly movably mounted on the motor vehicle body. The rear door 2 also comprises an outer panel 35 and an inner panel 36 spaced laterally therefrom. The inner panel 36 has a front end with a lever 11 fixed thereto. The lever 11 has a front end pivotally supported on a bracket 13 which is fastened to a central pillar 12 of a motor vehicle body.

Figure 3:
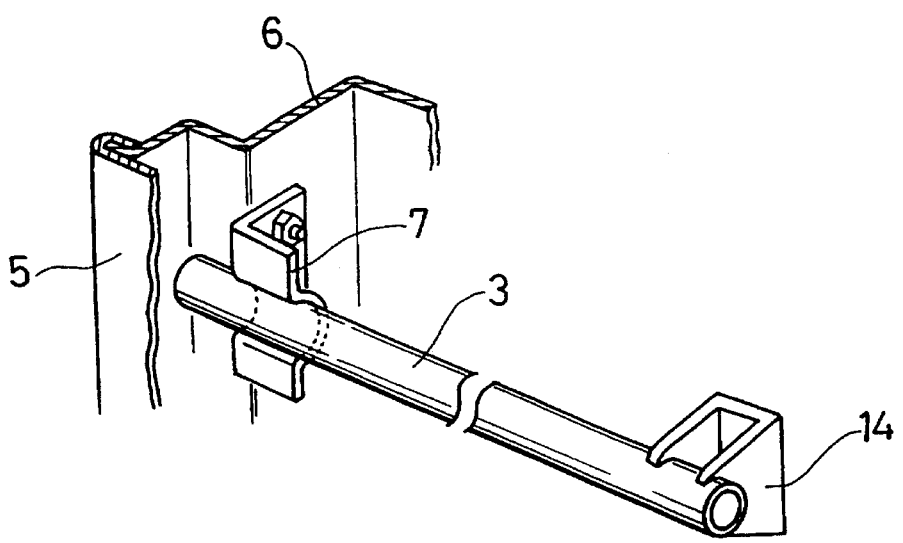
FIG. 3 is a fragmentary perspective view of a door beam in the front door shown in FIG. 2.

As shown in FIGS. 2 and 3, each of the door beams 3 has a rear end overlapping the central pillar 12 in the lateral direction of the motor vehicle when the front door 1 is closed, and a bracket 14 which has a channel-shaped horizontal cross section is fixed to the rear end of the door beam 3. The bracket 14 projects inwardly from the door beam 3 toward the central pillar 12. Therefore, the bracket 14 is positioned laterally of and closely to the central pillar 12 when the front door 1 is closed.

The door beams 4 housed in the rear door 2 are arranged similarly to the door beams 3 housed in the front door 1.

The bracket 14 serves as a spacer in a region between the rear end of the front door 1 and the central pillar 12. The bracket 14 is effective in giving the front door 1 a high lateral rigidity to efficiently absorb and distribute lateral shocks applied during a lateral collision from an initial phase thereof.

Figure 4:
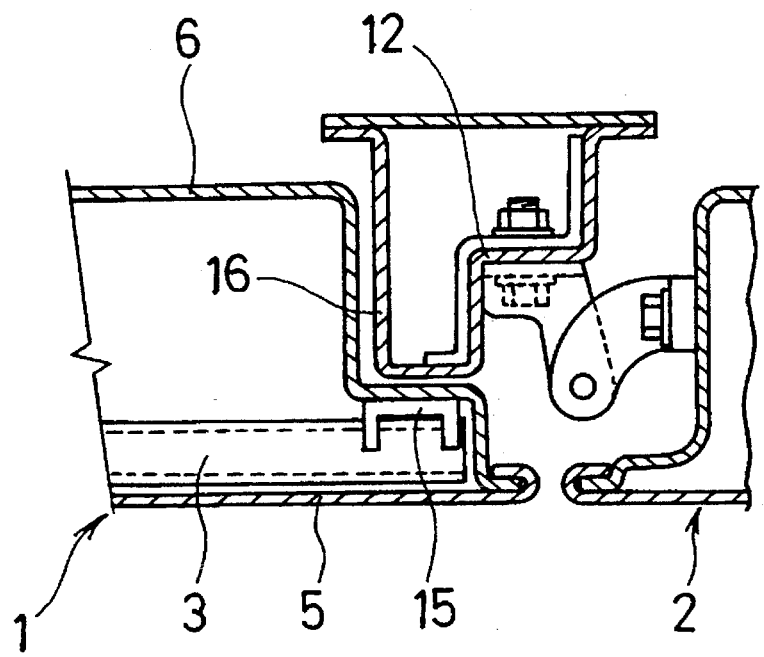
FIG. 4 is a fragmentary horizontal cross-sectional view of a front door which incorporates a vehicle body side structure according to another embodiment of the present invention.
Figure 5:
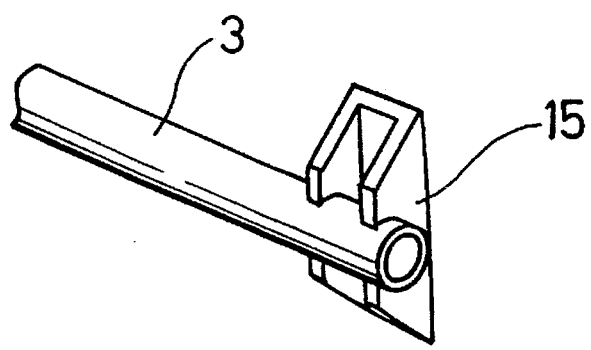
FIG. 5 is a fragmentary perspective view of a door beam in the front door shown in FIG. 4.

FIG. 4 shows a front door which incorporates a vehicle body side structure according to another embodiment of the present invention. FIG. 5 shows a door beam housed in the front door shown in FIG. 4. As shown in FIGS. 4 and 5, a front door 1 comprises an outer panel 5 and an inner panel 6 spaced laterally therefrom, and a door beam 3 is housed in the front door 1 closely to the outer panel 5. A bracket 15 is mounted on the rear end of a door beam 3 housed in a front door 1 does not project inwardly from the door beam 3 but extends vertically, i.e., both upwardly and downwardly, from the door beam 3. A central pillar 12 includes a bulging portion 16 projecting outwardly toward the rear end of the front door 1. As a result, the bracket 15 is positioned laterally of and closely to the central pillar 12 when the front door 1 is closed.

Because the bracket 15 extends both upwardly and downwardly, it has a relatively wide area for contact with the bulging portion 16 of the central pillar 12 through the inner panel 6, for thereby effectively absorbing and distributing lateral shocks applied during a lateral collision from an initial phase thereof.

Figure 6:
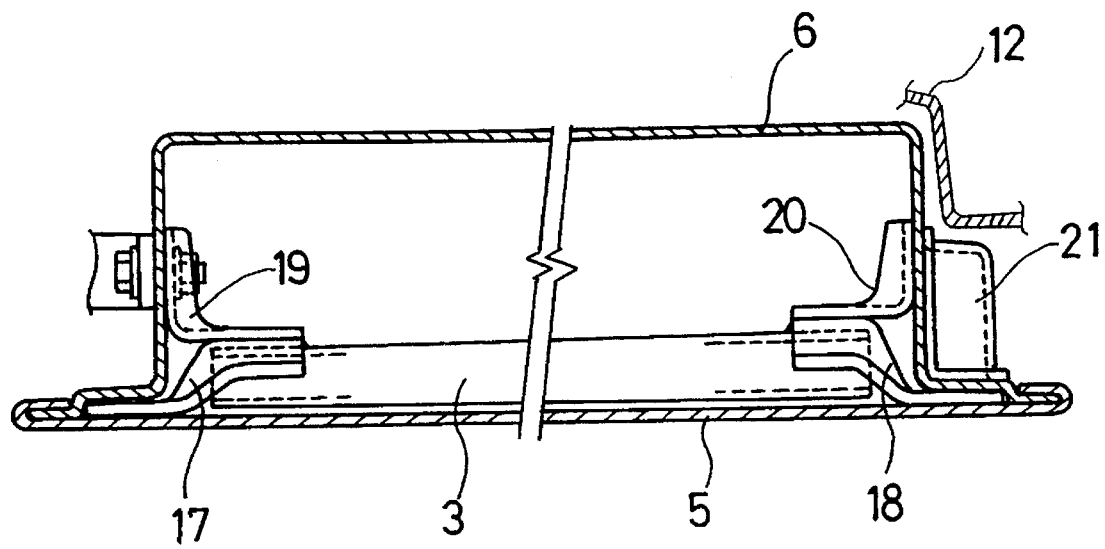
FIG. 6 is a fragmentary horizontal cross-sectional view of a front door which incorporates a vehicle body side structure according to still another embodiment of the present invention.
Figure 7:
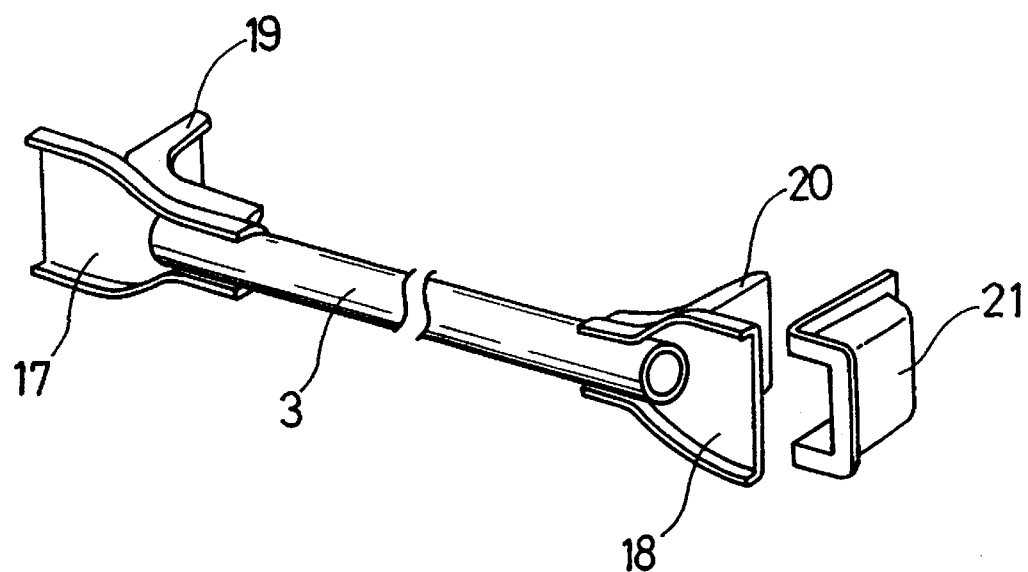
FIG. 7 is a fragmentary perspective view of a door beam in the front door shown in FIG. 6.

FIG. 6 shows a front door which incorporates a vehicle body side structure according to still another embodiment of the present invention. FIG. 7 shows a door beam housed in the front door shown in FIG. 6. As shown in FIGS. 6 and 7, a front door 1 comprises an outer panel 5 and an inner panel 6 spaced laterally therefrom, and a door beam 3 is housed in the front door 1 closely to the outer panel 5. The door beam 3 has front and rear ends fixed to the front door 1 by respective flat brackets 17, 18 sandwiched between the outer and inner panels 5, 6 and respective L-shaped brackets 19, 20 joined to the inner panel 6. Specifically, the flat brackets 17, 18 have ends secured to the respective front and rear ends of the door beam 3 and opposite ends sandwiched between the outer and inner panels 5, 6. The L-shaped brackets 19, 20 have respective arms joined to the respective flat brackets 17, 18 and other respective arms joined to the respective front and rear ends of the inner panel 6.

A cup-shaped bracket 21 with one side open is fixed as a spacer to the outer surface of the rear end of the inner panel 6 and extends toward a central pillar 12. The cup-shaped bracket 21 overlaps the central pillar 12 in the lateral direction of the motor vehicle.

The cup-shaped bracket 21 secured to the front door 1 is effective in efficiently absorbing and distributing lateral shocks applied during a lateral collision from an initial phase thereof.

Figure 8:
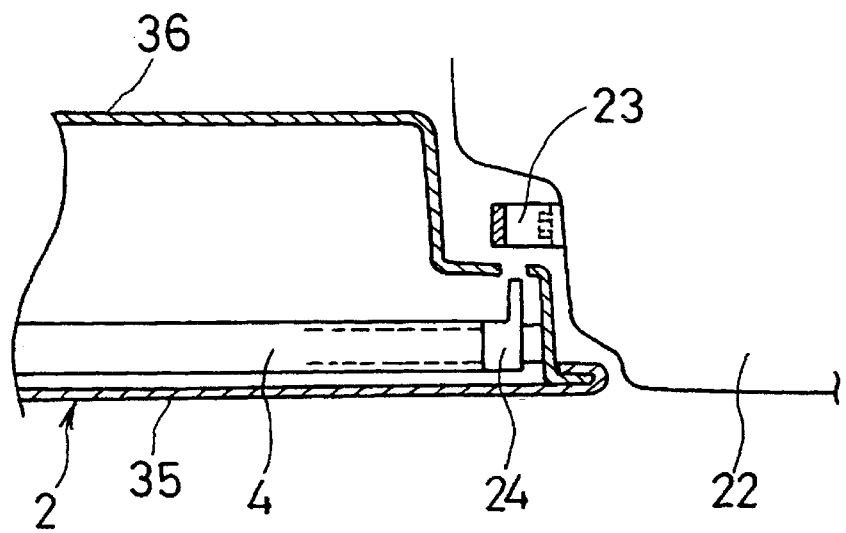
FIG. 8 is a fragmentary horizontal cross-sectional view of a rear door which incorporates a vehicle body side structure according to yet still another embodiment of the present invention.

FIG. 8 shows a rear door which incorporates a vehicle body side structure according to yet still another embodiment of the present invention. In FIG. 8, a rear door 2 comprises an outer panel 35 and an inner panel 36 spaced laterally therefrom, and a door beam 4 is housed in the rear door 2 closely to the outer panel 35. A vehicle body used in combination with the rear door 2 includes a wheel arch 22 which covers a rear wheel, and a latch 23 is mounted on a front surface of the wheel arch 22 and projects into the passenger's compartment in the vehicle body. A bracket 24 is mounted on the rear end of the door beam 4 in the rear door 2. When the vehicle body suffers a lateral collision, the bracket 24 on the rear end of the door beam 4 engages the latch 23, thus absorbing and distributing shocks which are applied.

Figure 9:
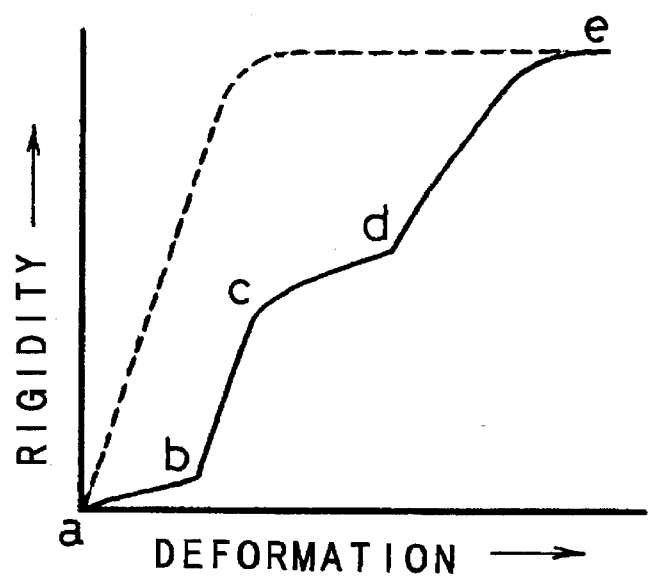
FIG. 9 is a graph showing the relationship between the deformation and rigidity of a vehicle body side structure according to the present invention and a conventional vehicle body side structure.
Figure 10:
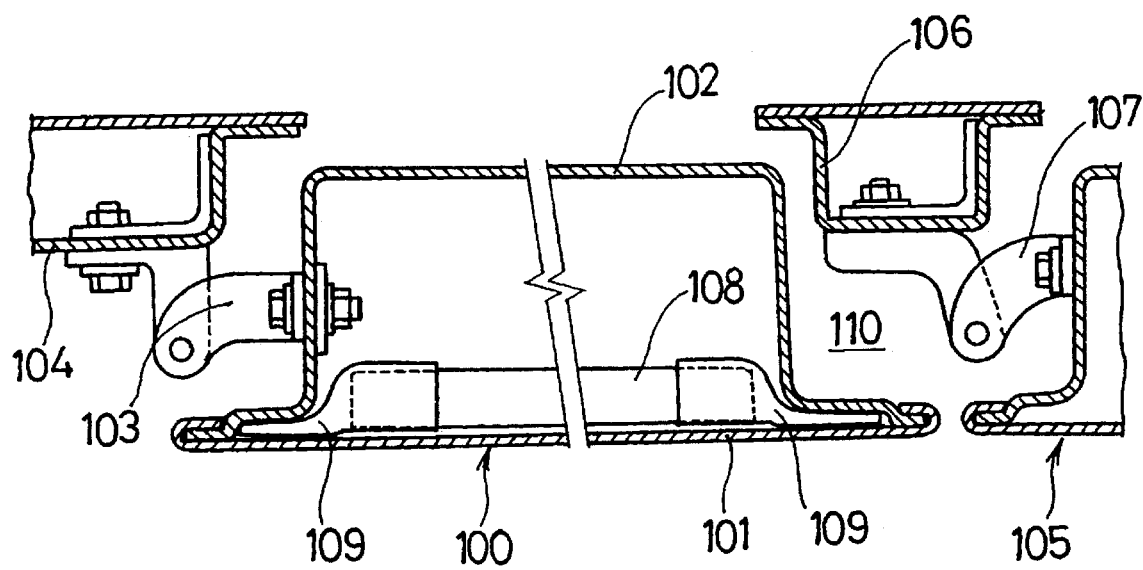
FIG. 10 is a fragmentary horizontal cross-sectional view of a front door which incorporates a conventional vehicle body side structure.

FIG. 9 shows the relationship between the deformation and rigidity of a vehicle body side structure according to the present invention and a conventional vehicle body side structure such as shown in FIG. 10. With the conventional vehicle body side structure, since the space exists between the central pillar and the rear end of the door beam, when the motor vehicle suffers a lateral collision, the door as it is deformed moves into the passenger's compartment due to the space as indicated by a line segment ab, and then, the door beam ends supported by the respective flat brackets are deformed as indicated by a line segment cd. With the vehicle body side structure according to the present invention, inasmuch as the rear end of the door beam is positioned closely to the central pillar because of the spacer or the bulging portion of the pillar, the lateral rigidity of the door is relatively high during a lateral collision from an initial phase thereof, resulting in an efficient absorption and distribution of applied shocks owing to an increase in the amount of energy absorption which is represented by an area surrounded by solid and broken lines in FIG. 9.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A vehicle body side structure in a vehicle body, comprising:

a door, said door having an outer panel and an inner panel spaced laterally inward therefrom;

a door beam housed in said door, said door beam being an elongated member located in between said outer panel and said inner panel; said door beam having an inner side facing and being spaced laterally from the inner panel and having an outer side which is closely adjacent said outer panel; and said door beam extending in a longitudinal direction of the vehicle body from a rear end of the door beam to a front end of the door beam;

a central pillar extending generally vertically in the vehicle body, said central pillar having an outermost surface thereof spaced laterally inward from said inner side of said door beam, and said door beam having an end portion at said rear end overlapping said outermost surface of said central pillar in said longitudinal direction when said door is closed; and spacer means mounted on said inner side on said end portion of said door beam and extending laterally inward toward said outermost surface of said pillar, said spacer means having an inner surface which is positioned relatively closely to said outermost surface of said central pillar when said door is closed.

2. A vehicle body side structure according to claim 1, wherein said spacer means comprises a bracket projecting from said end of the door beam toward said pillar.

3. A vehicle body side structure according to claim 2, wherein said bracket is of a channel-shaped horizontal cross section.

4. The vehicle body side structure of claim 1, wherein said door beam is a tubular member having a generally constant circular cross-section.

5. The vehicle body side structure of claim 1, wherein said door beam has a generally constant cross-section.

6. The vehicle body side structure of claim 4, further including a second door beam, which is also a tubular member, and wherein said door beams converge in a V-shape with the point of the V-shape being at said rear end portion.

7. The vehicle body side structure according to claim 1, wherein said spacer means comprises a bracket which is mounted so as to extend from said inner side of said door beam.

8. A vehicle body side structure of claim 1, wherein said door beam has a generally constant cross section along the entire length thereof.

9. A vehicle body side structure of claim 8, wherein said door beam is a tubular member.

10. A vehicle body side structure of claim 1, wherein said spacer means is located entirely in between said outer panel and said inner panel of said door.

11. A vehicle body side structure in a vehicle body, comprising:

a door, said door having an outer panel and an inner panel spaced laterally inward therefrom;

a door beam housed in said door, said door beam being an elongated member located in between said outer panel and said inner panel; said door beam having an inner side facing and being spaced laterally from the inner panel and having an outer side which is closely adjacent said outer panel; and said door beam extending in a longitudinal direction of the vehicle body from a rear end of the door beam to a front end of the door beam;

a central pillar extending generally vertically in the vehicle body, said central pillar having an outermost surface thereof spaced laterally inward from said inner side of said door beam, and said door beam having an end portion at said rear end overlapping said outermost surface of said central pillar in said longitudinal direction when said door is closed; and spacer means extending laterally substantially between said inner side on said end portion of said door beam and said outermost surface of said pillar.

12. The vehicle body side structure of claim 11, wherein said door beam has a generally constant cross-section.

13. The vehicle body side structure of claim 11, wherein said door beam is a tubular member having a generally constant circular cross-section.

14. A vehicle body side structure of claim 11, wherein said door beam has a generally constant cross section along the entire length thereof.

15. A vehicle body side structure of claim 14, wherein said door beam is a tubular member.

16. A vehicle body side structure of claim 11, wherein said spacer means extends off of said inner side of said door beam.

* * * * *